US012567700B2

(12) United States Patent
Zhang et al.

(10) Patent No.: US 12,567,700 B2
(45) Date of Patent: Mar. 3, 2026

(54) ELECTRICAL CONNECTOR

(71) Applicant: Tyco Electronics (Shanghai) Co., Ltd., Shanghai (CN)

(72) Inventors: Wenfang (Felix) Zhang, Shanghai (CN); Yongjian (Justin) Huang, Shanghai (CN); Tongbao (Tim) Ding, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 451 days.

(21) Appl. No.: 18/173,430

(22) Filed: Feb. 23, 2023

(65) Prior Publication Data

US 2023/0268687 A1 Aug. 24, 2023

(30) Foreign Application Priority Data

Feb. 23, 2022 (CN) ........................ 202220372419.X

(51) Int. Cl.
*H01R 13/533* (2006.01)
*H01R 13/05* (2006.01)

(52) U.S. Cl.
CPC ........... *H01R 13/533* (2013.01); *H01R 13/05* (2013.01)

(58) Field of Classification Search
CPC .. H01R 13/533; H01R 13/05; H01R 33/7664; H01R 33/975; H01R 4/302
USPC .......................................................... 439/382
See application file for complete search history.

(56) References Cited

U.S. PATENT DOCUMENTS

| | | | | |
|---|---|---|---|---|
| 5,464,356 A * | 11/1995 | Nebeshima | H01R 13/4362 | 439/752 |
| 6,045,408 A * | 4/2000 | Takemasa | H01R 12/714 | 439/660 |
| 6,540,566 B1 * | 4/2003 | Wu | H01R 13/41 | 439/79 |
| 7,077,708 B1 * | 7/2006 | Johnson | H01R 13/506 | 439/906 |
| 8,100,703 B2 * | 1/2012 | Chen | H01R 12/716 | 439/83 |
| 8,282,415 B1 * | 10/2012 | Foltz | H01R 12/724 | 439/579 |
| 9,543,718 B2 * | 1/2017 | Dandl | H01R 13/6585 | |
| 11,955,745 B2 * | 4/2024 | Miyamura | H01R 13/4362 | |
| 2011/0061934 A1 * | 3/2011 | Jekielek | E21B 17/028 | 248/560 |
| 2012/0015546 A1 * | 1/2012 | Yamaguchi | H01R 13/05 | 439/625 |
| 2014/0017957 A1 * | 1/2014 | Horchler | H01R 13/631 | 439/680 |
| 2016/0072222 A1 * | 3/2016 | Hasegawa | H01H 50/048 | 439/382 |
| 2018/0006401 A1 * | 1/2018 | Ishibashi | H01R 13/621 | |
| 2018/0013240 A1 * | 1/2018 | Takeuchi | H01R 13/05 | |
| 2018/0274450 A1 * | 9/2018 | Zamai | F01D 25/28 | |

* cited by examiner

*Primary Examiner* — Harshad C Patel
(74) *Attorney, Agent, or Firm* — Barley Snyder

(57) ABSTRACT

An electrical connector comprises a housing defining a receiving slot adapted to receive a pin of a cluster block, and a connection terminal provided in the housing. At least one of the housing or the connection terminal defines an anti-shaking structure adapted to prevent the shaking of the electric connector with respect to the cluster block when the electrical connector is coupled with the cluster block.

17 Claims, 5 Drawing Sheets

ELECTRICAL CONNECTOR

CROSS-REFERENCE TO RELATED APPLICATIONS

This application claims the benefit of Chinese Patent Application No. CN 202220372419.X filed on Feb. 23, 2022 in the China National Intellectual Property Administration, the whole disclosure of which is incorporated herein by reference.

FIELD OF THE INVENTION

Embodiments of the present disclosure generally relate to the field of electrical connectors.

BACKGROUND

In related art, plug connections between electrical connectors and associated cluster or connection blocks are subject to vibration, often caused by improper assembly, as well as harsh environmental conditions. The vibration of the components relative to one another negatively impacts the stability of the electrical connection therebetween.

Improved electrical connectors which mitigate vibration between these components are desired.

SUMMARY

According to an embodiment of the present disclosure, an electrical connector comprises a housing defining a receiving slot adapted to receive a pin of a cluster block, and a connection terminal provided in the housing. At least one of the housing or the connection terminal defines an anti-shaking structure adapted to prevent the shaking of the electric connector with respect to the cluster block when the electrical connector is coupled with the cluster block.

BRIEF DESCRIPTION OF THE DRAWINGS

The invention will now be described by way of example with reference to the accompanying Figures, of which.

DETAILED DESCRIPTION OF THE EMBODIMENTS

Figure 1:
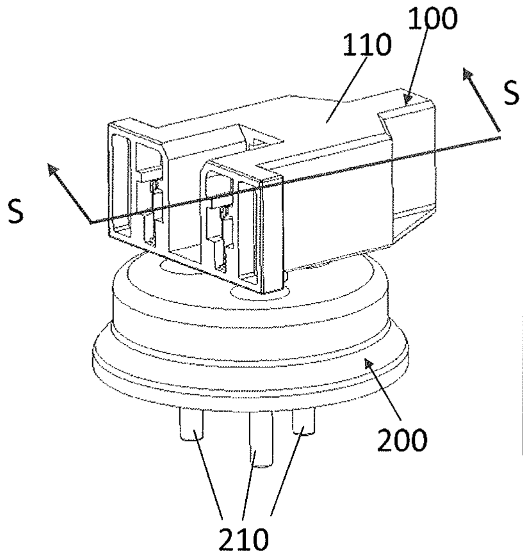
FIG. 1 shows a schematic perspective view of an electrical connector assembled into a cluster block according to a first exemplary embodiment of the present disclosure.
Figure 3:
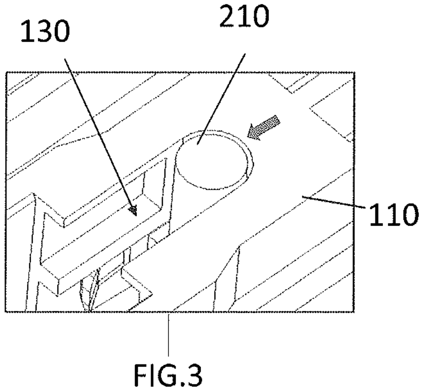
FIGS. 3 and 4 respectively show enlarged structures at an upper dotted box and a lower dotted box in FIG. 2.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to one embodiment of the present disclosure, an electrical connector includes a housing and a connecting terminal provided in the housing. The housing is formed with a receiving slot configured to receive a pin of a cluster block to achieve a connection between the pin and the connecting terminal. At least one of the housing or the connection terminal is formed with an anti-shaking structure adapted to prevent the shaking of the electric connector with respect to the connection block when the electrical connector is coupled with the cluster block.

FIGS. 1-4 show a state of an electrical connector 100 assembled to a cluster block 200 according to a first exemplary embodiment of the present disclosure. According to the first exemplary embodiment of the present disclosure, the electrical connector 100 includes a housing 110, and a connection terminal provided in the housing (not shown for clarity purposes). The housing 110 is formed with a receiving slot 120 sized and located, or adapted, to receive a pin 210 of a cluster block 200 to realize a connection between the pin 210 and the connection terminal provided in the housing 110.

An anti-shaking structure is formed in at least one of the housing and the connection terminal, and is configured to prevent the shaking of the electric connector 100 with respect to the cluster block 200 when the electrical connector 100 is coupled with the cluster block 200. As shown in the figures, the housing 110 may have a plurality (e.g., three) of receiving slots 120, each of the receiving slots 120 corresponding to one connection terminal, and at least one of each receiving slot 120 and the corresponding connection terminal is formed with the anti-shaking structure.

Figure 2:
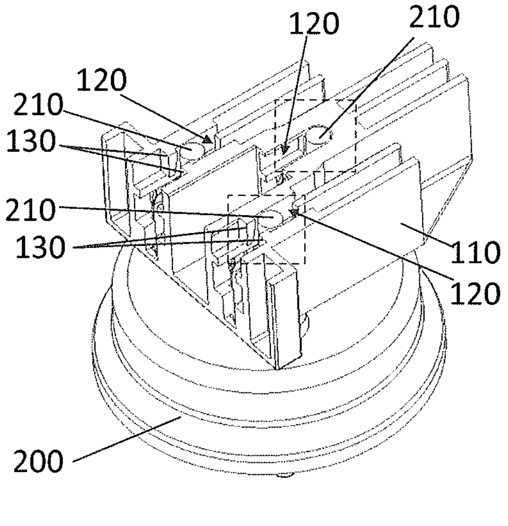
FIG. 2 shows a sectional view of the electrical connector of FIG. 1 taken along line S-S.
Figure 4:
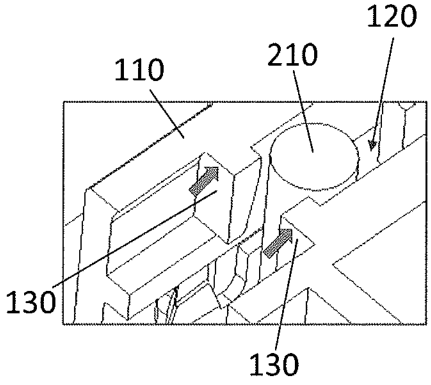

Specifically, in the first exemplary embodiment as shown in FIGS. 1-4, the anti-shaking structure is formed in the housing 110. The anti-shaking structure includes at least one first constraint feature 130 extending toward the receiving slot 120 from a slot wall forming around the receiving slot 120, the first constraint feature 130 being capable of constraining the positioning of the pin 210 in the receiving slot 120 from the same side of the pin 210 when the electrical connector 100 is coupled with the cluster block 200. Specifically, the at least one first constraint feature 130 is a protruded ridge integrated with the slot wall forming around the receiving slot 120. As shown in FIG. 2, three pins 210 of the cluster block 200 are essentially distributed in a triangular shape. The first pin 210 on the upper right in the figure is directly abutted against the slot wall of receiving slot 120. The second pin 210 and the third pin 210 on the upper left and lower left are formed with a protruded ridge 130 integrated with the slot wall forming around the receiving slot 120, respectively, as shown in FIG. 4. The slot wall of the receiving slot 120 and the protruded ridge 130 together constrain the positioning of the three pins 210 in the receiving slot 120 by the structure as described above, effectively mitigating the phenomenon of the relative shaking between the electrical connector and the cluster block which is easy to arise during the plug connection, thus ensuring the stability of the connection.

Figure 5:
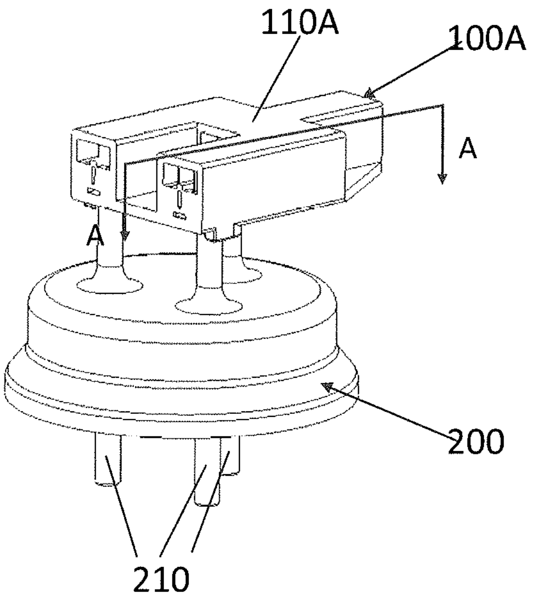
FIG. 5 shows a schematic perspective view of an electrical connector assembled into a cluster block according to a second exemplary embodiment of the present disclosure.
Figure 6:
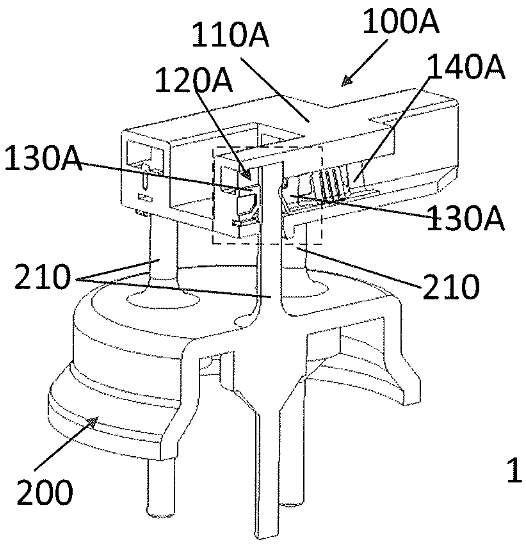
FIG. 6 shows a sectional view of the electrical connector and the cluster block of FIG. 5 taken along line A-A.
Figure 7:
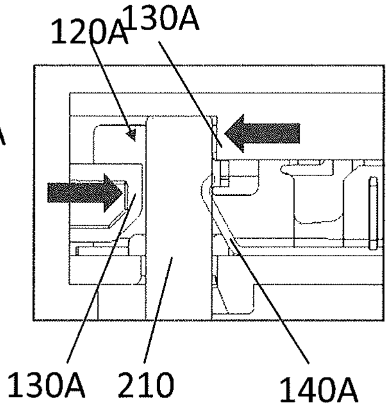
FIG. 7 shows an enlarged structure at the dotted box in FIG. 6.

FIGS. 5-7 show a second exemplary embodiment of the present disclosure. It should be noted that the structure and construction of the electrical connector and the cluster block in the second exemplary embodiment are essentially the same as those described in the first exemplary embodiment as described above, except for the anti-shaking structure. Therefore, the following focuses on the anti-shaking structure of the electrical connector in the second exemplary embodiment to avoid overstatement.

In the second exemplary embodiment shown in FIGS. 5-7, the anti-shaking structure is formed in the housing 110A. The anti-shaking structure includes at least one pair of second constraint features 130A extending toward the receiving slot 120A from the slot wall formed around the receiving slot 120A, the second constraint feature 130A being capable of constraining the positioning of the pin 210 in the receiving slot 120A from two opposite sides of the pin 210 when the electrical connector 100A is coupled with the cluster block 200. The pin 210 is in contact with the connection terminal 140A located in the receiving slot 120A. More specifically, the at least one pair of second constraint features 130A is a pair of protruded ridges integrated with the slot wall forming around the receiving slot 120A and located on two opposite sides of the receiving slot 120A, respectively. That is, as shown in FIGS. 6 and 7, each pin 210 is provided with the pair of protruded ridges located on the two opposite sides of the receiving slot 120A in the receiving slot 120A of the housing 110A. The positioning of each pin 210 in the receiving slot 120A is constrained by the pair of protruded ridges, effectively preventing the phenomenon of the relative shaking between the electrical connector and the cluster block which is easy to arise during the plug connection, thus ensuring the stability of the connection.

Figure 8:
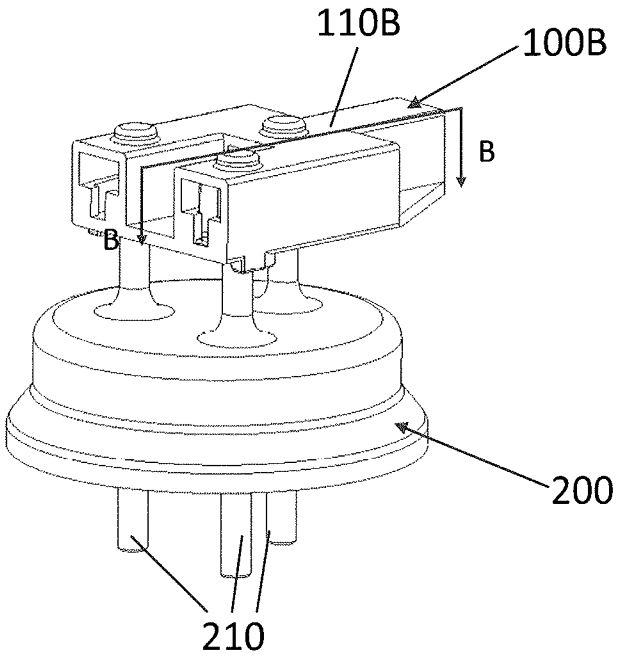
FIG. 8 shows a schematic perspective view of an electrical connector assembled into a cluster block according to a third exemplary embodiment of the present disclosure.
Figure 9:
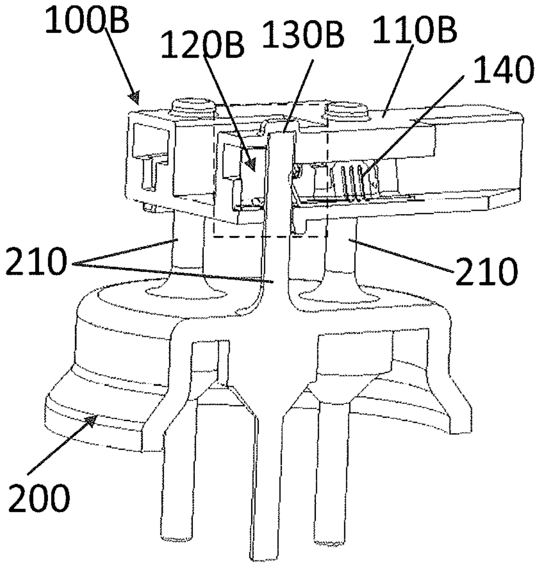
FIG. 9 shows a sectional view of the electrical connector and the cluster block of FIG. 8 taken along line B-B.
Figure 10:
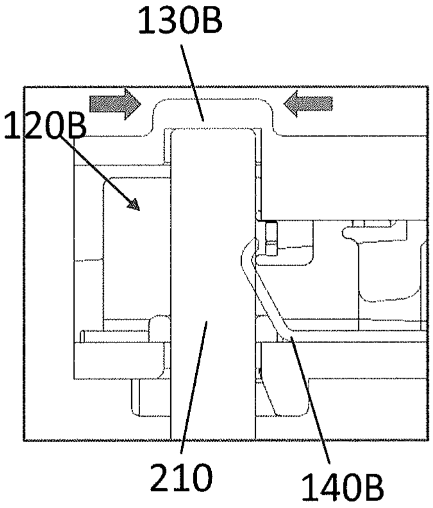
FIG. 10 shows an enlarged structure at the dotted box in FIG. 9.
Figure 11:
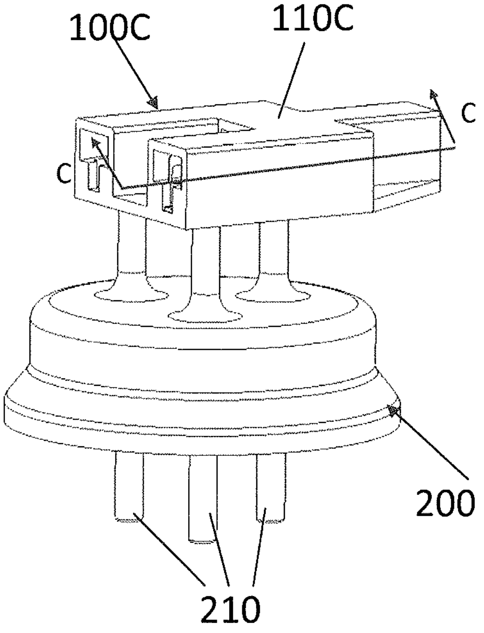
FIG. 11 shows a schematic perspective view of an electrical connector assembled into a cluster block according to a fourth exemplary embodiment of the present disclosure.
Figure 14:
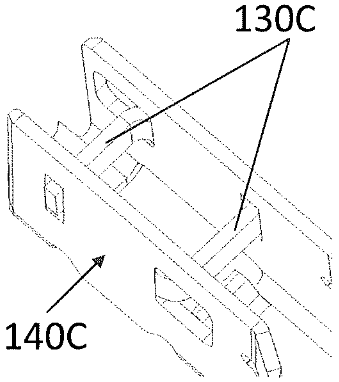
FIG. 14 shows an enlarged view of the connection terminal in the electrical connector as shown in FIG. 11.
Figure 12:
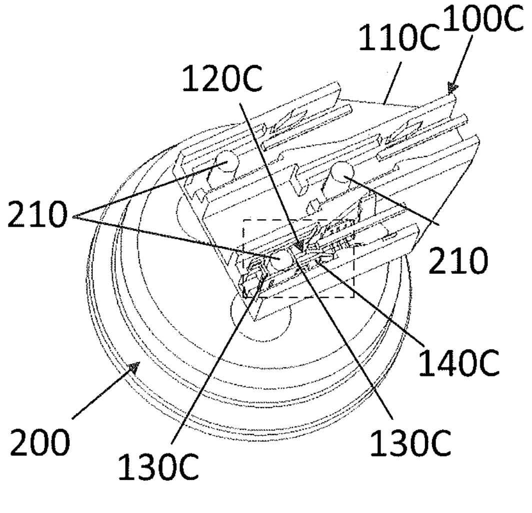
FIG. 12 shows a sectional view of the electrical connector of FIG. 11 taken along line C-C.
Figure 13:
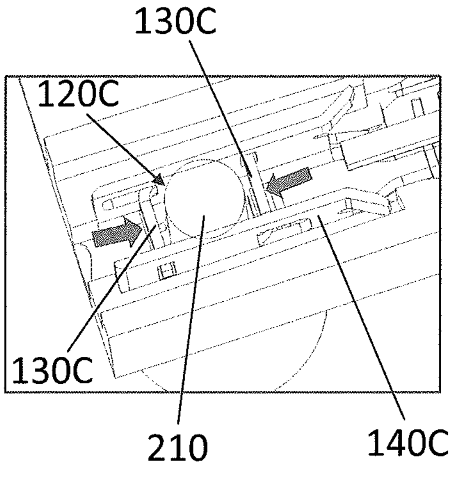
FIG. 13 shows an enlarged view at the dotted box in FIG. 12.

FIGS. 8-10 show a third exemplary embodiment of the present disclosure. It should be noted that the structure and construction of the electrical connector and the cluster block in the third exemplary embodiment are essentially the same as those described in the first and the second exemplary embodiment as described above, except for the anti-shaking structure. Therefore, the following focuses on the anti-shaking structure of the electrical connector in the third exemplary embodiment to avoid overstatement.

In the third exemplary embodiment shown in FIGS. 8-10, the anti-shaking structure is formed in the housing 110B. The anti-shaking structure includes a third constraint feature 130B formed at the bottom of the receiving slot 120B, the third constraint feature 130B being capable of receiving an end of pin 210 inserted into the receiving slot 120B when the electrical connector 100B is coupled with the cluster block 200. The pin 210 is in contact with the connection terminal 140B located in the receiving slot 120B. More specifically, the third constraint feature 130B is a recess formed at a portion of the housing 110B corresponding to the bottom of the receiving slot 120B. As shown in FIGS. 9 and 10, the recess is formed at the bottom of the receiving slot 120B of the housing 110B, and the positioning of each pin 210 in the receiving slot 120B is constrained by the recess, effectively avoiding the phenomenon of the relative shaking between the electrical connector and the cluster block which is easy to arise during the plug connection, thus ensuring the stability of the connection.

FIGS. 11-14 show a fourth exemplary embodiment of the present disclosure. Again, it should be noted that the structure and construction of the electrical connector and the cluster block in the fourth exemplary embodiment are essentially the same as those described in the first, the second, and the third exemplary embodiment as described above, except for the anti-shaking structure. Therefore, the following focuses on the anti-shaking structure of the electrical connector in the fourth exemplary embodiment to avoid overstatement.

In the fourth exemplary embodiment, the anti-shaking structure is formed in the connection terminal 140C which is different form the anti-shaking structure that is formed in the housing shown in the first, the second and the third exemplary embodiments. The anti-shaking structure includes a transverse beam portion 130C formed at a receiving portion of the connecting terminal 140C, the transverse beam portion 130C being capable of constraining the positioning of pin 210 in the receiving slot 120C from two opposite sides of the pin 210 when the electrical connector 100C is coupled with the cluster block 200. The positioning of each pin 210 in the receiving slot 120C is constrained by the transverse beam portion 130C formed at the receiving portion of the connecting terminal 140C, effectively avoiding the phenomenon of the relative shaking between the electrical connector and the cluster block which is easy to arise during the plug connection, thus ensuring the stability of the connection.

Figure 15:
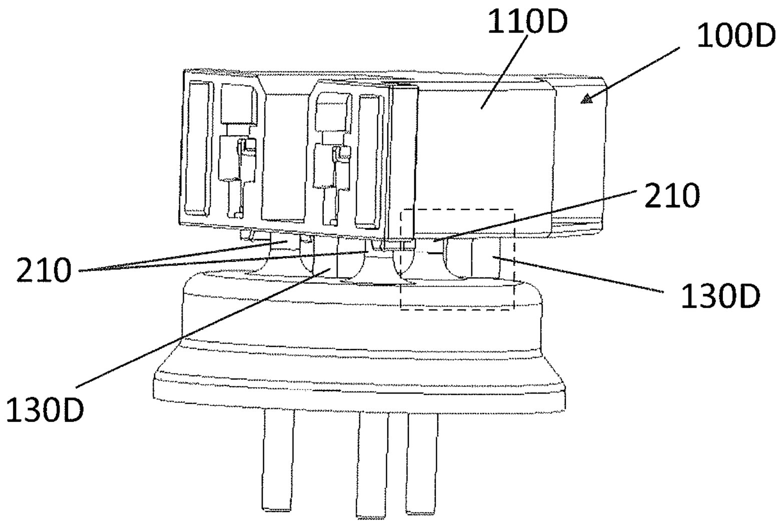
FIG. 15 shows a schematic perspective view of an electrical connector assembled into the cluster block according to a fifth exemplary embodiment of the present disclosure.
Figure 16:
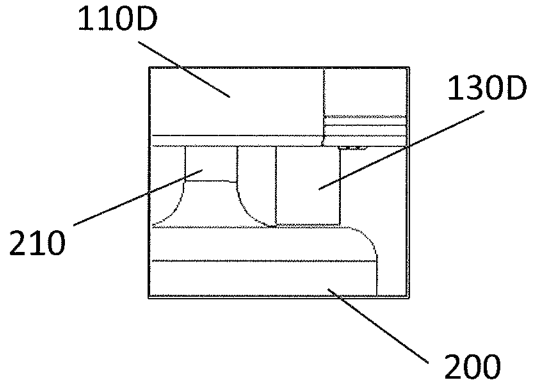
FIG. 16 shows an enlarged view at the dotted box in FIG. 15.

FIGS. 15 and 16 show a fifth exemplary embodiment of the present disclosure. It should be noted that the structure and construction of the electrical connector and the cluster block in the fifth exemplary embodiment are essentially the same as those described in the first, the second, the third and the fourth exemplary embodiment as described above, except for the anti-shaking structure. Therefore, the following focuses on the anti-shaking structure of the electrical connector in the fifth exemplary embodiment to avoid overstatement.

In the fifth exemplary embodiment, the anti-shaking structure is formed in the housing 110D. The anti-shaking structure includes a supporting stud 130D extending outward from an outer surface of the housing 110D, the supporting stud 130D being capable of being supported on an outer surface of a housing of the cluster block 200 when the electrical connector 100D is coupled with the cluster block 200. That is, in the present disclosure, the anti-shaking structure (namely the supporting stud 130D) is formed on the outer surface of the housing 110D. The shaking of the housing 110D of the electric connector 100D with respect to the cluster block 200 is constrained by providing the supporting stud 130D, effectively avoiding the phenomenon of the relative shaking between the electrical connector and the cluster block which is easy to arise during the plug connection, thus ensuring the stability of the connection.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:

a housing defining a receiving slot adapted to receive a pin of a cluster block; and a connecting terminal provided in the housing, at least one of the housing or the connection terminal defines an anti-shaking structure adapted to prevent the shaking of the electric connector with respect to the cluster block when the electrical connector is coupled with the cluster block, and the anti-shaking structure includes at least one pair of constraint elements extending toward the receiving slot from a slot wall formed around the receiving slot, the constraint elements constrain the positioning of the pin in the receiving slot from two opposite sides of the pin when the electrical connector is coupled with the cluster block.

2. The electrical connector according to claim 1, wherein the anti-shaking structure is formed in the housing.

3. The electrical connector according to claim 2, wherein the anti-shaking structure includes at least one first constraint element extending toward the receiving slot from a slot wall formed around the receiving slot.

4. The electrical connector according to claim 3, wherein the first constraint element constrains the positioning of the pin in the receiving slot from a same side of the pin when the electrical connector is coupled with the cluster block.

5. The electrical connector according to claim 4, wherein the at least one first constraint element comprises a protruded ridge integrated with the slot wall formed around the receiving slot.

6. The electrical connector according to claim 1, wherein the at least one pair of constraint elements include a pair of protruded ridges integrated with the slot wall formed around the receiving slot and located on two opposite sides of the receiving slot, respectively.

7. The electrical connector according to claim 2, wherein the anti-shaking structure includes a constraint element formed at a bottom of the receiving slot, the constraint element receiving an end of the pin inserted into the receiving slot when the electrical connector is coupled with the cluster block.

8. The electrical connector according to claim 7, wherein the constraint element includes a recess formed at a portion of the housing corresponding to the bottom of the receiving slot.

9. The electrical connector according to claim 1, wherein the anti-shaking structure is formed in the connecting terminal.

10. The electrical connector according to claim 9, wherein the anti-shaking structure includes a transverse beam portion formed at a receiving portion of the connecting terminal.

11. The electrical connector according to claim 10, wherein the transverse beam portion constrains the positioning of the pin in the receiving slot from two opposite sides of the pin when the electrical connector is coupled with the cluster block.

12. The electrical connector according to claim 2, wherein the anti-shaking structure includes a supporting stud extending outward from an outer surface of the housing, the supporting stud being supported on an outer surface of a housing of the cluster block when the electrical connector is coupled with the cluster block.

13. The electrical connector according to claim 1, wherein the housing has a plurality of the receiving slots, each of which corresponds to one connection terminal.

14. The electrical connector according to claim 13, wherein at least one of each of the receiving slots and the corresponding connection terminal is formed with the anti-shaking structure.

15. An electrical connector, comprising:

a housing defining a receiving slot adapted to receive a pin of a cluster block; and a connecting terminal provided in the housing, at least one of the housing or the connection terminal defines an anti-shaking structure adapted to prevent the shaking of the electric connector with respect to the cluster block when the electrical connector is coupled with the cluster block, the anti-shaking structure includes a transverse beam portion formed at a receiving portion of the connecting terminal.

16. The electrical connector according to claim 15, wherein the transverse beam portion constrains the positioning of the pin in the receiving slot from two opposite sides of the pin when the electrical connector is coupled with the cluster block.

17. An electrical connector, comprising:

a housing defining a receiving slot adapted to receive a pin of a cluster block; and a connecting terminal provided in the housing, at least one of the housing or the connection terminal defines an anti-shaking structure adapted to prevent the shaking of the electric connector with respect to the cluster block when the electrical connector is coupled with the cluster block, the anti-shaking structure includes a supporting stud, when the electrical connector is coupled with the cluster block, and the supporting stud is supported on an outer surface of a housing of the cluster block.

* * * * *